April 1, 1941.  A. FRAZIER  2,236,942

MOTOR VEHICLE HEADLIGHT

Filed July 12, 1939

Andrew Frazier
INVENTOR.

BY *Chsnow Leo*

ATTORNEYS.

Patented Apr. 1, 1941

2,236,942

UNITED STATES PATENT OFFICE 2,236,942

MOTOR VEHICLE HEADLIGHT

Andrew Frazier, Martinsville, Va.

Application July 12, 1939, Serial No. 284,052

1 Claim. (Cl. 240—48.2)

This invention relates to motor vehicle headlights, the primary object of the invention being to provide a headlight having means for eliminating glare, and at the same time divert the light rays projected from the lamp, to the side of the road, illuminating the edge of the road and insuring ample illumination of the road surface at the center of the road, for safe driving.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
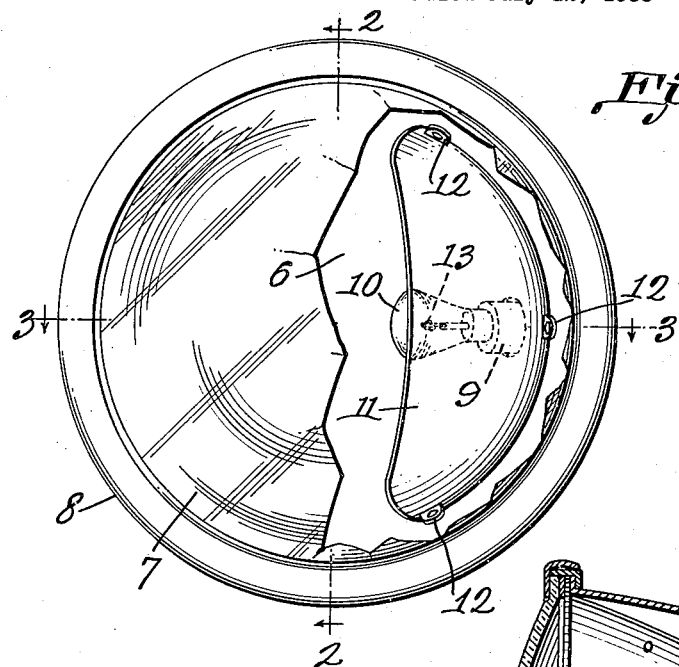
Figure 1 is an elevational view illustrating a lamp constructed in accordance with the invention, the lens of the lamp being broken away to illustrate the invention.
Figure 2:
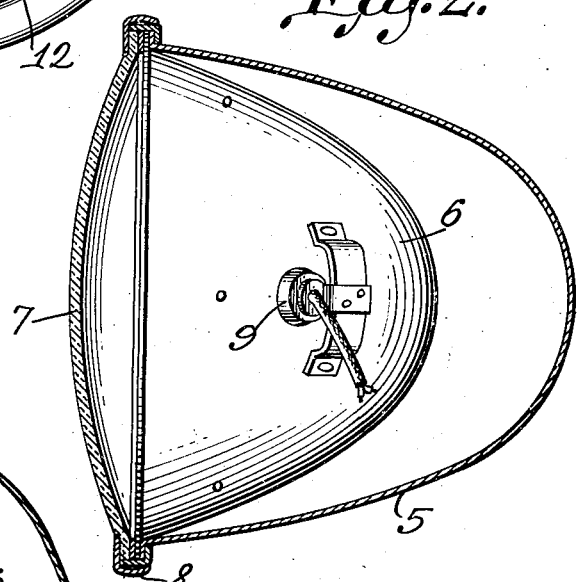
Figure 2 is a sectional view taken on line 2—2 of Figure 1.

Referring to the drawing in detail, the reference character 5 designates a lamp housing which is provided with the usual reflector 6 held in place in the usual and well known manner.

The lens of the lamp is indicated at 7 and is held to the lamp housing, by means of the lens securing ring 8 which is shown as clamping the lens to the lamp housing.

Figure 3:
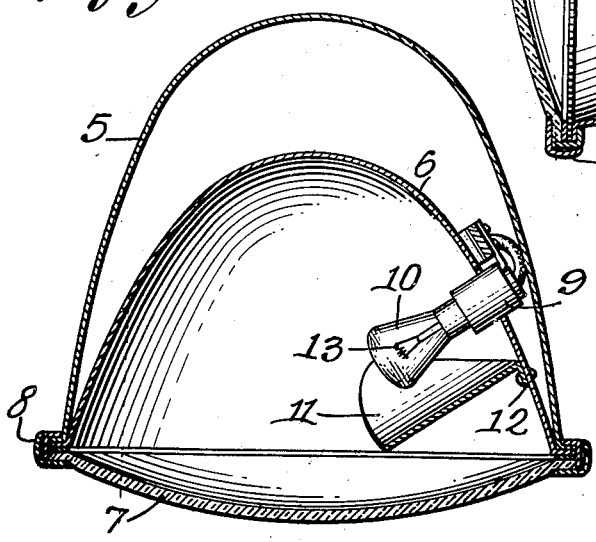
Figure 3 is a sectional view taken on line 3—3 of Figure 1.

In my invention, the lamp socket which is indicated at 9 is extended inwardly from one side of the reflector 6, as clearly shown by Figure 3 of the drawing, the lamp 10 supported therein, being disposed at an oblique angle, with respect to the lens 7.

The reference character 11 designates a shield, which is secured within the confines of the reflector 6, the shield being provided with ears 12 extending therefrom, and by means of which the shield is secured in position.

It will be seen that the width of the shield 11 is such that the free edge thereof completely covers the filament 13 of the lamp 10 eliminating glare and at the same time directing the light rays through substantially one-half of the lens.

From the foregoing it will be seen that due to the construction shown and described, the light rays from the lamp will illuminate the shoulder or edge of the road so that the driver of the vehicle equipped with the light will have full view of the edge of the road at all times. It will also be seen that light rays striking the reflector, will be directed to the center of the road, giving ample illumination for safe driving in passing vehicles.

What is claimed is:

A headlight for motor vehicles, comprising a lamp housing, a reflector within the lamp housing and being curved conforming to the shape of the lamp housing, a lamp socket and lamp extending inwardly an appreciable distance from the side wall of the reflector and being located on a medial line drawn horizontally through the lamp housing, said lamp being disposed at an oblique angle with respect to the side wall of the reflector, a substantially wide vertically elongated shield secured to the outer surface of the reflector and overlying the lamp in spaced relation therewith, and the outer ends of said shield extending appreciable distances above and below the lamp, said shield extending inwardly to a point covering substantially the entire lamp, and said shield being inwardly curved directing light rays from the lamp inwardly towards the center of the reflector.

ANDREW FRAZIER.